US008626869B2

(12) United States Patent
Takada et al.

(10) Patent No.: US 8,626,869 B2
(45) Date of Patent: Jan. 7, 2014

(54) COMMUNICATION APPARATUS, COMMUNICATION SYSTEM, AND COMMUNICATION METHOD

(75) Inventors: Hiroaki Takada, Nagoya (JP); Ryo Kurachi, Nagoya (JP); Yukihiro Miyashita, Yokkaichi (JP)

(73) Assignees: National University Corporation Nagoya University, Nagoya (JP); Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 244 days.

(21) Appl. No.: 12/990,732

(22) PCT Filed: Jul. 10, 2009

(86) PCT No.: PCT/JP2009/003253
§ 371 (c)(1),
(2), (4) Date: Nov. 2, 2010

(87) PCT Pub. No.: WO2010/004768
PCT Pub. Date: Jan. 14, 2010

(65) Prior Publication Data
US 2011/0047244 A1     Feb. 24, 2011

(30) Foreign Application Priority Data

Jul. 10, 2008  (JP) ................................. 2008-180684

(51) Int. Cl.
*G06F 15/16*     (2006.01)
(52) U.S. Cl.
USPC ........... 709/217; 709/248; 709/249; 709/207; 370/503; 370/509; 370/501; 370/492
(58) Field of Classification Search
USPC ......... 370/313, 467, 536, 533, 532, 512, 492, 370/505, 504, 501, 503, 509; 709/217, 207, 709/29, 32, 33; 455/432, 345
See application file for complete search history.

(56) References Cited

U.S. PATENT DOCUMENTS 7,046,638 B1 *   5/2006  Klausner et al. .............. 370/313
2007/0121661 A1 *  5/2007  Ohta et al. .................... 370/412
(Continued)

FOREIGN PATENT DOCUMENTS

JP      A-11-261611      9/1999
JP      A-2003-179584    6/2003
(Continued)

OTHER PUBLICATIONS

M. Tanaka et al., "High-Reliability Physical Layer for In-Vehicle High-Speed Local Area Network," *Fukuoka Electric Review*, Jun. 28, 1991, No. 88, pp. 43-50 (with translation).

(Continued)

*Primary Examiner* — Ian N Moore
*Assistant Examiner* — Phong La
(74) *Attorney, Agent, or Firm* — Oliff & Berridge, PLC

(57) ABSTRACT

When sending data, an ECU sends time lag information indicating a time lag that is a difference between time of generating time point at which the data is generated and time of sending start time point at which the ECU actually starts sending the data. When transferring the data, a relay apparatus adds time lag information indicating a time lag that is a difference between time of receiving start time point at which the relay apparatus starts receiving the data and time of transferring start time point at which the relay apparatus starts transferring the data, onto the time lag added on the received data. When receiving the data, an ECU determines for the received data the time of the generating time point that is earlier the time lag indicated by the time lag information of the received data than the time at which the ECU starts receiving the data.

7 Claims, 7 Drawing Sheets

(56) References Cited

U.S. PATENT DOCUMENTS

2008/0309460 A1* 12/2008 Jefferson et al. ............. 340/10.1
2009/0077264 A1*  3/2009 Machida ........................ 709/248
2009/0109797 A1*  4/2009 Eidson ............................ 368/10

FOREIGN PATENT DOCUMENTS

| | | |
|---|---|---|
| JP | A-2005-199954 | 7/2005 |
| JP | A-2007-101457 | 4/2007 |
| JP | A-2007-295081 | 11/2007 |
| WO | WO 2007/105471 A1 | 9/2007 |

OTHER PUBLICATIONS

H. Aota et al., "CAN—Controller Area NetWork—," *Journal of Robotics Society of Japan*, Sep. 15, 2003, vol. 21, No. 6, pp. 52-56 (with Abstract).

International Search Report issued in Application No. PCT/JP/2009/003253; dated Oct. 27, 2009 (with translation).

* cited by examiner

F I G. 3
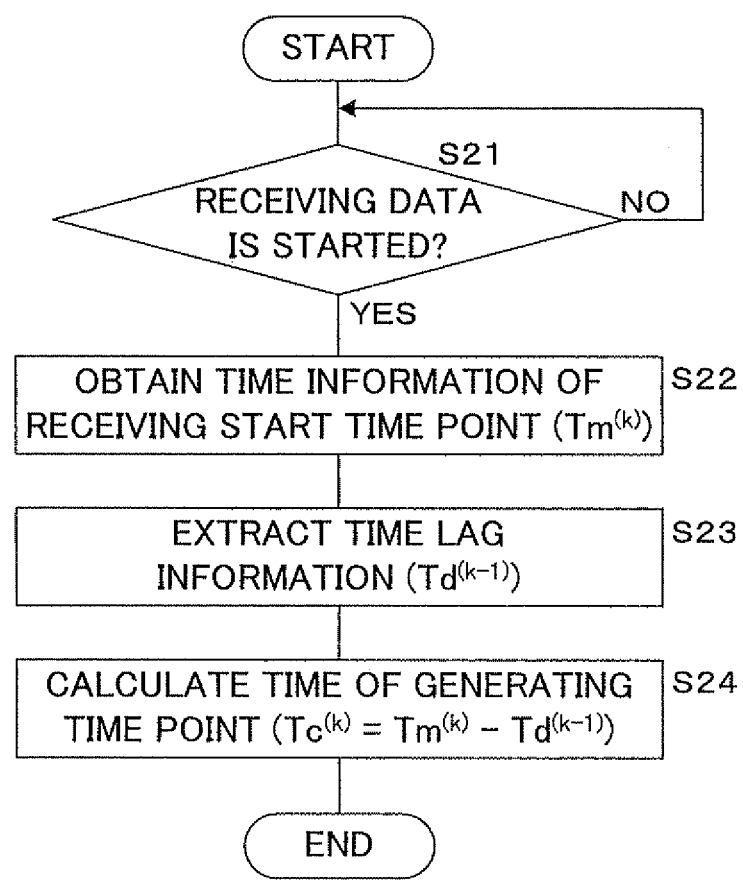

US 8,626,869 B2

COMMUNICATION APPARATUS, COMMUNICATION SYSTEM, AND COMMUNICATION METHOD

BACKGROUND OF THE INVENTION

This application is the national phase under 35 U.S.C. §371 of PCT International Application Ser. No, PCT/W2009/003253 which has an International filing date of Jul. 10, 2009 and designated the United States of America.

1. Field of the Invention

The present invention relates to a communication system for sending and receiving data among a plurality of communication apparatuses. Furthermore, the present invention relates to a communication apparatus that can utilize simple configurations to determine a generating time point of received data, a communication system including the communication apparatus, and a communication method.

2. Description of Related Art

It is recently known in several fields to utilize a system having many communication apparatuses, in which each communication apparatus is provided with a certain function and connected with other communication apparatuses in order to perform many operations through the data exchange between many communication apparatuses. For example, it is known in a field of local area network (LAN) mounted on a motor vehicle to utilize electronic control units (ECUs) as the communication apparatuses, to make each ECU perform a certain operation and to exchange data between the ECUs, in order to provide many functions to be implemented by a system.

Generally, available period is applied to each data in the case of performing a process for exchanging data whose contents have to be changed momentarily among a plurality of communication apparatuses. It may cause a problem if an extremely old data is utilized, for example, by an ECU of an on-vehicle LAN field which controls safety functions.

A patent document 1 shows that each ECU controls to send and receive data in accordance with a priority order based on arrival expiry time for minimizing a number of data which arrive after the arrival expiry time. In the patent document 1, absolute time is utilized for obtaining the arrival expiry time and each ECU includes time clock means for clocking time based on reference time which is synchronized among ECUs in order to send preferentially the data whose arrival expiry time comes earlier among data to be sent.

[Patent document 1] Japanese Patent Application Laid-Open No. 2007-295081

SUMMARY OF THE INVENTION

In the case of clocking time based on reference time which is synchronized among ECUs as shown by the patent document 1, it may be possible to accurately recognize a generating time point at which data is generated by another communication apparatus, such as another ECU, through receiving time information of the generating time point clocked by said another communication apparatus.

Communication apparatuses may be connected to each other, and may respectively comprise clock means for clocking time such as a timer. Furthermore, there may be several methods to synchronize time to be clocked among the communication apparatuses. However, in order to do such synchronization, each communication apparatus has to perform a process to make the time clocked by own clock means correspond with a reference time sent from another communication apparatus or has to include a function of Global Positioning System (GPS) receiver.

The present invention was made in view of such circumstances, and has a primary object to provide a communication apparatus that can accurately determine time at the generating time point of data received from another communication apparatus with simple configurations without synchronizing time clocked by provided clock means, a communication system comprising the communication apparatus, and a communication method.

An apparatus of a first aspect according to the present invention is a communication apparatus having a clock means, a communication means for sending and receiving data, and a possibility decision means for deciding whether it is possible or not to send data by the communication means, comprising: a means for obtaining a time lag between time at a generating time point that data is generated and time at a sending start time point that it is started to send the data whose sending is decided to be possible by the possibility decision means; a means for adding time lag information indicating the obtained time lag onto the data; a means for determining a receiving start time point based on time of the clock means; and a determination means for determining a generating time point of data based on the time lag information and the receiving start time point.

An apparatus of a second aspect according to the present invention is a communication apparatus further comprising: a means for acquiring a sending start time point of data by the clock means, when it is decided by the possibility decision means that it is possible to send data by the communication means; and a means for obtaining a time lag between time at the acquired sending start time point and time at the generating time point of the data, wherein time lag information indicating the obtained time lag is added on the data that is already started to be sent.

An apparatus of a third aspect according to the present invention is a communication apparatus further comprising: a determination means for determining a sending start time point of sending data; an obtaining means for obtaining a time lag between the determined sending start time point and the generating time point; a means for adding time lag information indicating the obtained time lag onto the data; a means for deciding on the basis of time of the clock means whether the sending stat time point determined by the determination means has come or not; and a means for trying to send, by the communication means, the data and the time lag information added on the data, when it is determined that the sending stat time point has come, wherein, when it is decided to be not-possible by the possibility decision means, a new sending start time point for starting to send secondarily is re-determined, the time lag is re-obtained, and data sending is re-tried.

An apparatus of a fourth aspect according to the present invention is a communication apparatus further comprising: a means for further transferring, when data with the added time lag information is received by the communication means, the data to another communication apparatus by the communication means; an obtaining means for obtaining a time lag between time at the generating time point of data determined by the determination means and time at a transferring start time point of data; and a means for utilizing the time lag information indicated by the obtained time lag as the time lag information added on the transferred data.

A system of a fifth aspect according to the present invention is a communication system comprising a plurality of communication apparatuses, each of which has a clock means, a communication means for sending and receiving data, and a possibility decision means for deciding whether it is possible or not to send data by the communication means, wherein each communication apparatus comprises: a means for obtaining a time lag between time at a generating time point that data is generated and time at a sending start time point that it is started to send the data whose sending is decided to be possible by the possibility decision means; a means for adding time lag information indicating the obtained time lag onto the data; a means for determining a receiving start time point based on time of the clock means; and a determination means for determining a generating time point of data based on the time lag information and the receiving start time point.

A method of a sixth aspect according to the present invention is a communication method in which a communication apparatus having a clock means and a communication means for sending and receiving data decides whether it is possible or not to send data by the communication means and send the data in the case of deciding that it is possible to send the data by the communication means, wherein the communication apparatus: starts sending the data in response to deciding that it is possible to send the data by the communication means; obtains a sending start time point of the data by the clock means; calculates a time lag between time of the obtained sending start time point and time of a generating time point at which the data is generated; and adds time lag information indicating the calculated time lag onto the data having started to be sent, and then sends the data.

A method of a seventh aspect according to the present invention is a communication method in which a communication apparatus having a clock means and a communication means for sending and receiving data decides whether it is possible or not to send data by the communication means and send the data in the case of deciding that it is possible to send the data by the communication means, wherein the communication apparatus: determines a sending start time point to send data; calculates a time lag between time of the determined sending start time point and time of a generating time point at which the data is generated; adds time lag information indicating the calculated time lag onto the data; decides whether it reaches to the sending start time point or not; tries to send the data and the time lag information added on the data by the communication means, when deciding it reaches to the sending start time point; re-determines a new sending start time point for re-sending the data; re-calculates the time lag; and re-tries to send the data.

In the first aspect and the fifth aspect according to the present invention, the time lag information is added onto data which indicates a time lag between time at a generating time point that data is generated and time at a sending start time point that sending of the data has actually become possible and has been started. When there is a negligible time lag between the time of sending start time point and the time of the receiving start time point, the time of the generating time point of data is earlier the time indicated by the time lag information than the time of the receiving start time point.

In the second aspect and the sixth aspect according to the present invention, time is obtained at the sending start time point when data sending has been started for the data whose transmission is decided to be possible. Thus, it is possible to obtain a time lag based on the information accurately indicating the sending start time point at which the data transmission has been actually started, and then such the accurate information is added onto the data to be sent.

In the third aspect and the seventh aspect according to the present invention, the sending start time point of data is previously determined, a time lag is calculated between the time at the determined sending start time point and the time at the generating time point of the data, and time lag information based on the calculated time lag is added onto the data. When the data is tried to be sent at the sending start time point and sending of the data is actually started in response to the decision indicating that it is possible to send the data, the time lag information indicating the accurate time lag is added onto the data during the sending process. When the sending of the data is not started in response to the decision indicating that it is not possible to send the data, time of the sending start time point is re-determined in accordance with the following chance of sending the data, the time lag information is re-obtained and the transmission of the data is re-tried on the basis of the re-obtained time lag information. Therefore, it is possible to add time lag information that can lead the accurate determination of the generating time point with simple configurations, even in the case that it is difficult to add the time lag information to the data during data sending process.

In the fourth aspect according to the present invention, the communication apparatus receives data from another communication apparatus, and transfers the received data. For transferring, the communication apparatus calculates a time lag based on own clock means between time of the generating time point of the received data and time of transferring time point for transferring the received data, and adds information of the calculated time lag onto the data to be transferred. Therefore, it is possible to make the communication apparatus accurately determine the generating time point of the received data on the basis of the time clocked by own clock means and of the time lag information received together with the data, even in the configurations that the data is transferred through a plurality of communication apparatus.

According to the present invention, it is possible to accurately determine the generating time point with simple configurations for sending and receiving data, but without synchronization processes of time clocked by clock means of each communication apparatus.

BRIEF DESCRIPTION OF THE DRAWINGS

The above and further objects and features of the invention will more fully be apparent from the following detailed description with accompanying drawings.

FIG. 3 is a flowchart showing an example of a procedure that the control unit of the ECU or a control unit of a relay apparatus receives data and determines a generating time point of the received data in the embodiment 1.

DESCRIPTION OF THE PREFERRED EMBODIMENTS

Hereinafter, an embodiment of the present invention is described in detail with reference to drawings. In embodiments 1 and 2 described below, a communication system according to the present invention is described in the context of a communication system mounted on a motor vehicle such as a car which includes a plurality of ECUs mounted on the motor vehicle for transmitting data with each other.

(Embodiment 1)

Figure 1:
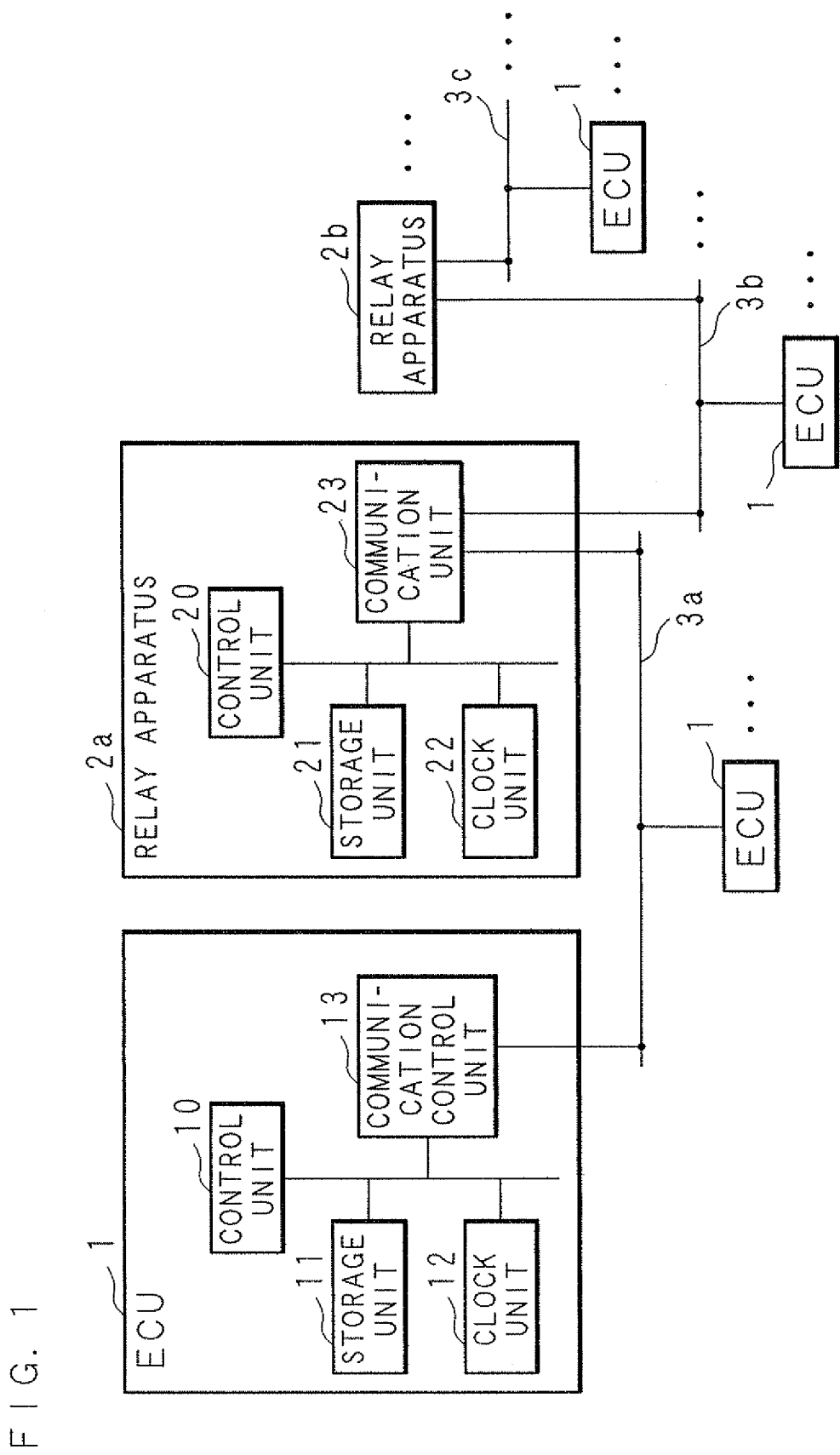
FIG. 1 is a block diagram showing components of a communication system mounted on a motor vehicle according to an embodiment 1.

FIG. 1 is a block diagram showing components of the communication system mounted on the motor vehicle according to an embodiment 1. The Communication System Mounted on the motor vehicle includes: ECUs 1, 1, . . . that are communication apparatuses sending and receiving data; relay apparatuses 2a, 2b, . . . that relay data transmitted among the ECUs 1, 1, . . . ; and communication lines 3a, 3b, . . . that connect the ECUs 1, 1, . . . and the relay apparatuses 2a, 2b, . . . .

The ECUs 1, 1, . . . are respectively connected to the different communication lines 3a, 3b, . . . . The relay apparatus 2a is connected both to the communication lines 3a, 3b, and is configured to relay data transmitted among the ECUs 1, 1, . . . respectively connected to the communication lines 3a, 3b. Similarly, the relay apparatus 2b is connected both to the communication lines 3b, 3c, and is configured to relay data transmitted among the ECUs 1, 1, . . . that are respectively connected to the communication lines 3b, 3c.

Each of the ECUs 1, 1, . . . includes: a control unit 10 that controls operations of each component; a storage unit 11 that stores data required for controlling the operations; a clock unit 12; and a communication unit 13 that controls communication via the communication lines 3a, 3b, . . . .

The control unit 10 of the ECU 1 is supplied with electric power from an electric power supply (not shown), such as a battery or alternator mounted on the motor vehicle, to control the each component.

The storage unit 11 is configured with a volatile memory and is configured to temporarily store the various data generated during processes performed by the control unit 10, the measured values indicated by signals being input from sensors described later or the data relayed by the relay apparatuses 2a, 2b, . . . .

The clock unit 12 clocks course of time through counting with a predetermined frequency. For example, the clock unit 12 clocks course of time from a predetermined reference time point. The reference time point may be a time point at which an electric power is supplied or may be a predetermined time of day (for example, Universal Time Coordinated; UTC). The control unit 10 obtains time information from the clock unit 12 at any given timing. Although the control unit 10 in each of the ECUs 1, 1, . . . obtains the time information from the clock unit 12 and the obtained time information indicates time, the indicated time is based on local time in each ECU 1 and the local time is not required to be synchronized among the ECUs 1, 1, . . . .

The communication control unit 13 includes a function as a network controller and implements communication via any of communication lines 3a, 3b, . . . . In this embodiment, it is configured to send and receive data between the ECUs 1, 1, . . . and the relay apparatuses 2a, 2b, . . . , on the basis of a Controller Area Network (CAN) protocol. Thus, the communication control unit 13 sends and receives data via the communication lines 3a, 3b on the basis of the CAN protocol. For example, as being connected to the communication line 3a, the control unit 10 of the ECU 1 monitors communication status of the communication line 3a with using the communication control unit 13, decides whether the control unit 10 can send data or not, and sends the data in the case of determining that the control unit can send the data. Particularly, as being connected to the communication line 3a, the control unit 10 of one ECU 1 can make the communication control unit 13 send the data, in the case that data is not sent by another ECUs 1, 1, . . . and relay apparatus 2a that are, as well as said one ECU 1, connected to the communication line 3a. When data sending processes are tried to be started at the same time by a plurality of apparatuses between the ECUs 1, 1, . . . and the relay apparatus 2a that are connected to the communication line 3a, an arbitration process is performed to make any one of apparatus preferentially start the data sending process in order to send the data. Particularly, it is configured to apply an arbitration field for performing the arbitration process into a header added onto the beginning of the data that is transmitted on the basis of the CAN protocol, the arbitration process is performed for the communication line 3a on the basis of a bit string in the arbitration field, and the tried sending process is continued by only one apparatus, an ECU 1 or relay apparatus 2a, which is selected through the arbitration process. When data is sent by any one of apparatuses between the ECUs 1, 1, . . . and a relay apparatus 2a that are connected to the communication line 3a, the data is simultaneously received by apparatuses, the ECUs 1, 1, . . . and a relay apparatus 2a that are connected to the communication line 3a.

The ECUs 1, 1, . . . can send data including numerical information of several physical quantities, such as measured values, computed values and control values. Furthermore, the ECUs 1, 1, . . . can control an engine, brake or the like, with utilizing a microcomputer. For example, an ECU 1 is connected with a sensor (not shown) for detecting rotation speeds of wheels (wheel speed), and works as an antilock brake system (ABS). The ECU 1 controls the brake in accordance with the wheel speed detected through the sensor during braking time of the motor vehicle, and sends data including measured values of the wheel speed toward another ECUs 1, 1, . . . and the relay apparatus 2a, through the communication line 3a.

When each of the ECUs 1, 1, . . . sends such data including numerical information of several physical quantities, such as measured values, computed values and control values, information is added onto the ending of the data to be sent. The information indicates a generating time point, for example, the time point at which a sensor detects measured values of the wheel speed. Particularly, the each control unit 10 of ECUs 1, 1, . . . adds time lag information that indicates a time lag between the time of the generating time point and the time of the sending start time point at which the control units starts sending the data. When one of the ECUs 1, 1, . . . receives data and requires referring the generating time point of the received data, said one of the ECUs 1, 1, . . . utilizes the time lag information added on the received data, and determines the time of the generating time point that is earlier the lagged time indicated by the time lag information than the time of the receiving start time point at which said one of the ECUs 1, 1, . . . starts receiving the data.

The relay apparatus 2a includes: a control unit 20 that controls operations of each component; a storage unit 21 that stores various information; a clock unit 22; and a communication unit 23 that is connected to the communication lines 3a, 3b. Inner components of the relay apparatuses 2b, 2c are similar to those of the relay apparatus 2a, and thus are not described in detail.

The control unit 20 is configured with a Micro Processing Unit (MPU). In addition, the control unit 20 is supplied with electric power from an electric power supply (not shown), such as a battery or alternator mounted on the motor vehicle, to control the each component.

The storage unit 21 is configured with a volatile memory and is configured to temporarily store the data received from the ECUs 1, 1, . . . . In addition, the storage unit 21 is configured to store the various data generated during processes performed by the control unit 20.

The clock unit 22 performs counting with a predetermined frequency and clocks course of time. For example, the clock unit 22 clocks course of time from a predetermined reference time point. The reference time point may be a time point at which an electric power supply is started or may be a predetermined time of day (for example, UTC), similar to the reference time point of the each clock unit 12 of the ECUs 1, 1, . . . . The control unit 20 obtains time information from the clock unit 22 at any given timing. As the control unit 20 in each of the relay apparatuses 2a, 2b, . . . obtains the time information from the clock unit 22 and the obtained time information indicates time, the indicated time is based on the local time in each relay apparatus and the local time is not required to be synchronized among the relay apparatuses 2a, 2b, . . . .

The communication unit 23 implements data transmission with the ECUs 1, 1, . . . connected to the communication unit 23 via the communication lines 3a, 3b. Thus, the communication unit 23 sends and receives data on the basis of the CAN protocol. In addition, the communication unit 23 has a plurality of ports that can connect respectively to different communication lines 3a, 3b to send and receive data. As being connected to communication lines 3a, 3b, the control unit 20 of the relay apparatus 2a monitors communication status of the communication line 3a with using the communication unit 23, decides whether the control unit 20 can send data or not, and sends the data via the communication line 3a in the case of determining that the control unit 20 can send the data. Similarly, the relay apparatus 2a monitors communication status of the communication line 3b, decides whether the control unit 20 can send data or not, and sends the data via the communication line 3b in the case of determining that the control unit can send the data. In addition, the communication unit 23 can perform data transmissions through the different communication ports at the same time.

Each control unit 20 of the relay apparatuses 2a, 2b, . . . , as described above, can receive data from the ECUs 1, 1, . . . through the communication unit 23 and can transfer the received data to another ECUs 1, 1, . . . through another port different from the port through which the data is received. At that time, the control unit 20 further can transfer the time lag information for determining the generating time point of the data to be transferred, although the time lag information is transmitted together with the received data. It should be noted that the control unit 20 modifies and then transfers the time lag information. Particularly, the control unit 20 adds a time lag between the time of the receiving start time point at which the control unit 20 starts receiving the data and the time of the transferring start time point at which the control unit 20 starts transferring the received data, onto the time lag indicated by the time lag information that is added on the received data, in order to obtain a new time lag between the time of the generating time point at which the received data has been generated and the time of the transferring start time for the received data. In addition, the control unit 20 exchanges the time lag information having added onto the data to be transferred with new time lag information indicating the obtained new time lag, and then transfers the new time lag information.

Figure 2:
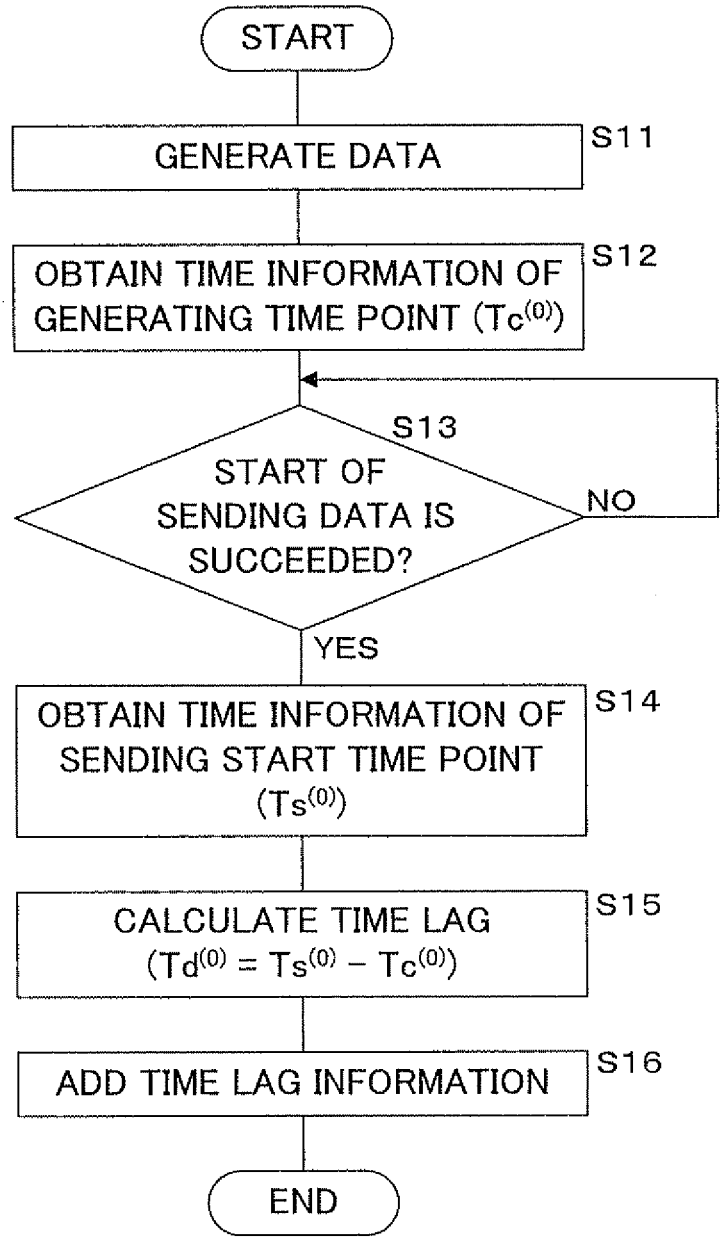
FIG. 2 is a flowchart showing an example of a communication procedure that a control unit of an ECU generates data and sends the data together with time lag information in the embodiment 1.

FIG. 2 is a flowchart showing an example of a communication procedure that each control unit 10 of ECUs 1, 1, . . . generates data and sends the generated data together with the time lag information in the embodiment 1. The following flowchart represents processes performed by the control unit 10 of an ECU 1 that is connected to the communication line 3a. Each control unit 10 of another ECUs 1, 1, . . . also performs similar processes.

The control unit 10 generates data including numerical information of several physical quantities (step S11), in the case of having detected the measured values through a sensor, having obtained the computed values that are computed in response to receiving another data, or having obtained the control values for controlling an object. At that time, the control unit 10 obtains information of the time of the generating time point at which the control unit 10 has generated the data, i.e., the time ($Tc^{(0)}$) of the generating time point clocked by the clock unit 12 (step S12).

In the following description, time information at each time point is represented by substitute letters with a superscript number, as the information of the time of the generating time point is represented by the "$Tc^{(0)}$" in the step S12. The superscript number is an arbitrary natural number (k) to identify an apparatus whose local time is utilized for the time information. Furthermore, the superscript number corresponds to a number of relayed times of the data. For example, the time of the generating time point in the step S12 is represented by the $Tc^{(0)}$, and the "0 (zero)" shows that the "$Tc^{(0)}$" is the time information based on the local time of the apparatus which has generated the data (data origin apparatus) with the "0 (zero)" number of relayed times. The superscript number may not be included in the transmitted time lag information.

The control unit 10 allows the communication control unit 13 to try sending the data that has been generated at the step S11, and decides whether the communication control unit 13 succeeds or fails to start sending the data (step S13). When having determined that the communication control unit 13 fails to start sending the data because another of the ECUs 1, 1, . . . or the relay apparatus 2a connected to the communication line 3a is in communication or the control unit 10 is not selected by the arbitration (S 13: NO), the control unit 10 returns the procedure to the step S13 and waits until the communication control unit 13 becomes to be able to start sending the data. In the case of having determined that the communication control unit 13 fails to start sending the data, the control unit 10 receives another data sent from said another of the ECUs 1, 1, . . . or the relay apparatus 2 through the communication control unit 13.

When having decided that the communication control unit 13 succeeds to start sending the data because the ECUs 1, 1, and the relay apparatus 2a connected to the communication line 3a are not in communication or the control unit 10 is selected by the arbitration (S 13: YES), the control unit 10 obtains information of the time of the sending start time point ($Ts^{(0)}$) clocked by the clock unit 12 (step S14). Strictly speaking, the time of the sending start time point ($Ts^{(0)}$) is the time when the ending of the arbitration field in the sent data is transmitted.

The control unit 10 calculates a time lag ($Td^{(0)}=Ts^{(0)}-Tc^{(0)}$) that is a difference for the sent data between the time of the sending start time point ($Ts^{(0)}$) and the time of the generating time point ($Tc^{(0)}$ (step S15), makes the communication control unit 13 add the time lag information indicating the calculated time lag ($Td^{(O)}$) onto the sent data that is in the sending process (step S16), and terminates the procedure after completing the sending process.

Therefore, the control unit 10 can calculate the time lag based on the accurate time information of the sending start time point at which the data has actually been sent ($Ts^{(O)}$), and the information of the calculated time lag is added into the sent data that is in the sending process, and is transmitted together with the sent data.

In the case that the communication control unit 13 performs communication processes based on the CAN protocol, the processes described below can implement the step S16 that adds the time lag information. For sending the data, the communication control unit 13 adds the header information including the arbitration field onto the beginning of the sent data, and adds the trailer information showing completion of sending data onto the ending of the sent data. Then, the sent data is transmitted by the communication control unit 13. The header information includes information about the length from the beginning of the header information to the ending of the trailer information. Thus, the time lag information is configured with particular numerical information and with a field having a predetermined length followed by the particular numerical information. Arbitrary numerical information is applied into the field indicating the time lag information, in advance. In addition, the field indicating the time lag information is configured to be re-writable by the communication control unit 13 even after the communication control unit 13 starts sending the data. The control unit 10 obtains the time of the sending start time point ($Ts^{(O)}$) when the communication control unit 13 succeeds to start sending the data. Further, the control unit 10 calculates the time lag ($Td^{(O)}$) and then instructs the communication control unit 13 to re-write the time lag information. Therefore, it is possible to add the time lag information onto the sent data that is in the sending process.

FIG. 3 is a flowchart showing an example of a procedure that each control unit 10 of the ECUs 1, 1, . . . or each control unit 20 of the relay apparatuses 2a, 2b, . . . receives data and determines a generating time point of the received data in the embodiment 1. The following flowchart represents processes performed by an ECU 1 connected to the communication line 3b. Another ECUs 1, 1, . . . and the relay apparatuses 2a, 2b, . . . also perform similar processes.

The control unit 10 determines whether the communication control unit 13 (the communication unit 23, in the case of the processes performed by each control unit 20 of the relay apparatuses 2a, 2b) has started receiving data or not (step S21). When having determined that the communication control unit 13 has not started receiving data yet (S21: NO), the control unit 10 returns the procedure to the step S21.

When having determined that the communication control unit 13 has already started receiving data (S21: YES), the control unit 10 obtains the time of the receiving start time point ($Tm^{(k)}$) clocked by the clock unit 12 (step S22). The control unit 10 further extracts the time lag information that indicates the time lag ($Td^{(k-1)}$) and is added on the received data of which the communication control unit 13 has started the receiving process at the step S21 (step S23). The control unit 10 furthermore calculates the time of the generating time point according to the received data based on the own local time ($Tc^{(k)} = Tm^{(k)} - Td^{(k-1)}$), with utilizing the time lag ($Td^{(k-1)}$) shown by the extracted time lag information and the time information of the receiving start time point ($Tm^{(k)}$) obtained at the step S22 (step S24). Then, the control unit 10 terminates the procedure for determining the time of the generating time point according to the received data.

Therefore, the control unit 10 of the ECU 1 connected to the communication line 3b can determine the time of the generating time point according to the data generated and sent by the ECU 1 connected to, for example, the communication line 3a. The time lag information shows a time lag from the time point that the data is actually generated till the time point that the data is actually sent. Thus, the data is accurately generated at the time point earlier the time lag shown by the time lag information than at the receiving start time point. The number information "k" in the flowchart of FIG. 3 corresponds to a number of relayed times of the data after the data is generated by an apparatus.

Figure 4:
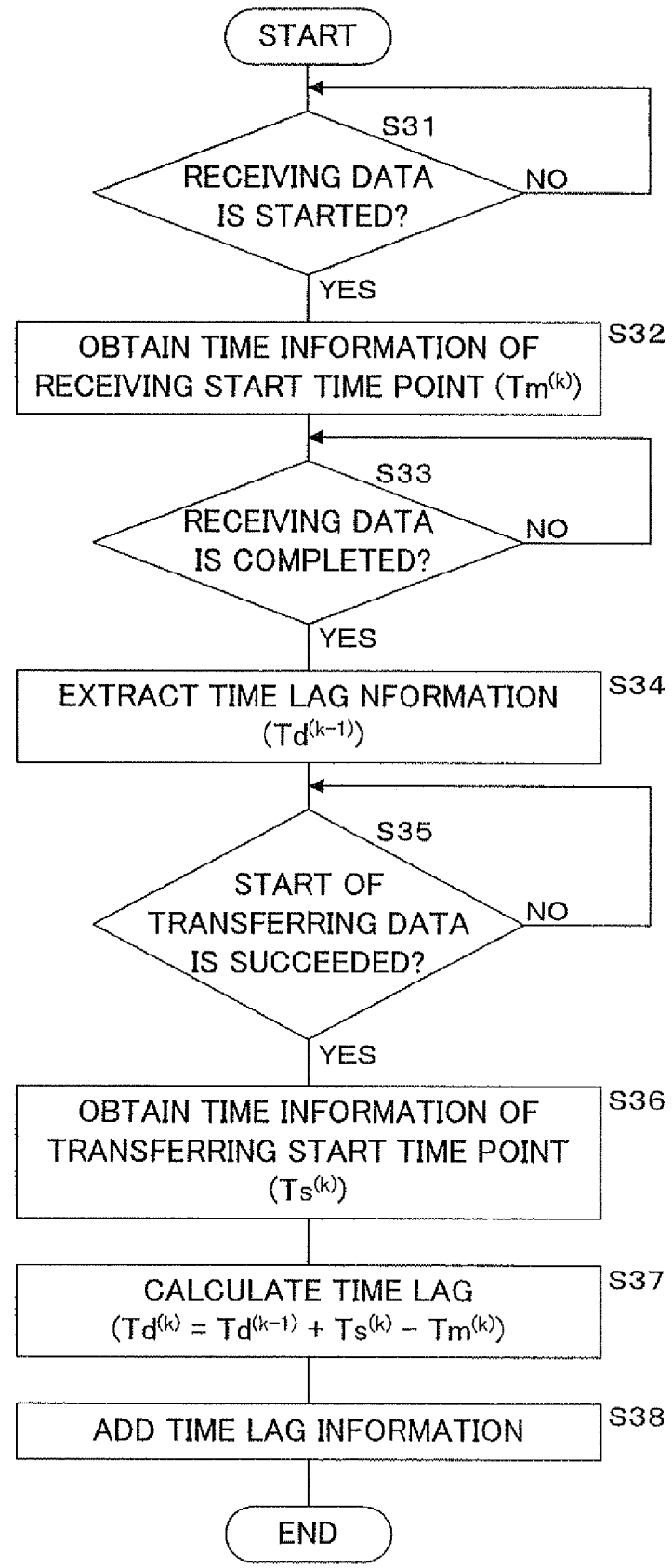
FIG. 4 is a flowchart showing an example of a communication procedure that the control unit of the relay apparatus transfers data in the embodiment 1.

FIG. 4 is a flowchart showing an example of a communication procedure that each control unit 20 of the relay apparatuses 2a, 2b, . . . transfers data in the embodiment 1. The following flowchart represents processes that the control unit 20 of the relay apparatus 2a connected to the communication lines 3a, 3b receives data from the ECU 1 connected to the communication line 3a and transfers the received data to each apparatus connected to the communication line 3b. The control unit 20 performs similar processes for receiving data from any apparatus connected to the communication line 3b and transferring the received data to the ECUs 1, 1, . . . connected to the communication line 3a, too. Each control unit 20 of another relay apparatuses 2b, 2c, . . . also performs similar processes.

The control unit 20 decides whether the communication unit 23 has started receiving data through the port of the communication unit 23 connected to the communication line 3a or not (step S31). When having decided that the communication unit 23 has not started receiving data yet (S31: NO), the control unit 20 returns the procedure to the step S31, monitors the communication line 3a connected to the communication unit 23 and waits until the communication unit 23 starts receiving data.

When having decided that the communication unit 23 has already started receiving data (S31: YES), the control unit 20 obtains information of the time of the receiving start time point ($Tm^{(k)}$) clocked by the clock unit 22 (step S32). Then, the control unit 20 decides whether the communication unit 23 has completed receiving the data or not (step S33). When having determined that the communication unit 23 has not completed receiving the data yet (S33: NO), the control unit 20 returns the procedure to the step S33.

When having decided through the detection of the trailer information that the communication unit 23 has already completed receiving the data (S33: YES), the control unit 20 extracts the time lag information that is added on the received data and shows the time lag ($Td^{(k-1)}$) (step S34).

In the case that the received data should be transferred to ECUs 1, 1, . . . and the relay apparatus 3b which are connected to the communication line 3b through a port different from the port through which the transferred data has been received, the control unit 20 allows the communication unit 23 to try transferring the received data and decides whether the communication unit 23 succeeds or fails to start transferring the data (step S35). When having decided that the communication unit 23 fails to start transferring the received data because another of the ECUs 1, 1, . . . or the relay apparatus 2b connected to the communication line 3b is in communication or the control unit 20 is not selected by the arbitration (S 35: NO), the control unit 20 returns the procedure to the step S35 and waits until the communication unit 23 becomes to be able to start transferring the received data.

When having decided that the communication unit 23 succeeds to start transferring the received data because the ECUs 1, 1, . . . and the relay apparatus 2b connected to the communication line 3b are not in communication or the control unit 20 is selected by the arbitration (S 35: YES), the control unit 20 obtains the time information of the transferring start time point ($Ts^{(k)}$) clocked by the clock unit 22 (step S36).

The control unit 20 calculates a time lag ($Td^{(k)}=Td^{(k-1)}+[Ts^{(k)}-Tm^{(k)}]$) that is a difference between the time of the transferring start time point according to the received data ($Ts^{(k)}$) and the time of the receiving start time point of the received data ($Tm^{(k)}$) plus the time lag indicated by the received (i.e., extracted) time lag information ($Td^{(k-1)}$) (step S37). Then, the control unit 20 makes the communication unit 23 add the calculated time lag information indicating the time lag ($Td^{(k)}$) onto the transferred data that is in the transferring process (step S38), and terminates the procedure after completing the transferring process.

In the case that the communication unit 23 performs communication processes based on the CAN protocol, the processes described below leads to add the calculated time lag information at the step S38, similarly in the case of the communication control unit 13. The time lag information is configured with particular numerical information and with a field having a predetermined length followed by the particular numerical information. The control unit 20 applies arbitrary numerical information into the field indicating the time lag information, in advance. The communication unit 23 is configured to be able to re-write the field for indicating time lag information after the transferring process of the received data is started. The control unit 20 obtains the time information of the transferring start time point ($Ts^{(k)}$) when the communication unit 23 succeeds to start transferring the received data. Further, the control unit 20 calculates the time lag ($Td^{(k)}$) and then instructs the communication unit 23 to re-write the time lag information of the field.

Figure 5:
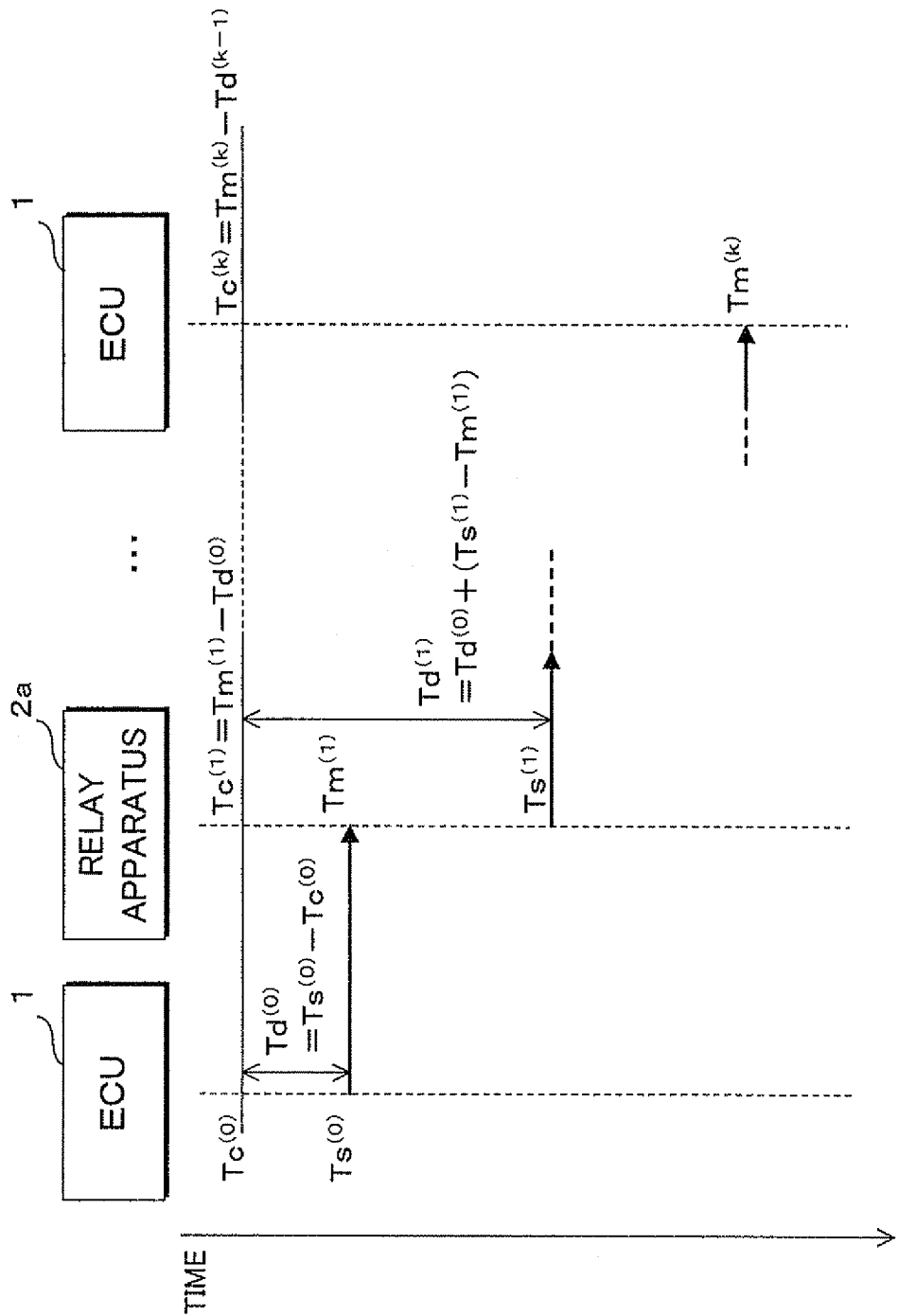
FIG. 5 is an explanation view showing processes for making any of ECUs or relay apparatus accurately determine the generating time point of the data transmitted by the ECU and the relay apparatus in the embodiment 1.

FIG. 5 is an explanation view showing processes for making any of ECUs 1, 1, . . . or relay apparatuses 2a, 2b accurately determine the generating time point of the data transmitted by the ECUs 1, 1, . . . and the relay apparatuses 2a, 2b, . . . in the embodiment 1. In FIG. 5, time is illustrated to elapse downward. The explanation view of FIG. 5 illustrates the case that data is generated by an ECU 1 connected to the communication line 3a and the relay apparatuses 2a transfer the generated data.

When the ECU 1 connected to the communication line 3a generates the data, the time information of the generating time point "$Tc^{(0)}$" is obtained. When the local time of the ECU 1 comes to the $Ts^{(0)}$, the ECU 1 starts sending the generated data. At that time, the ECU 1 adds the time lag information to the data to be sent, while the time lag information indicates the time lag $Td^{(0)}=Ts^{(0)}-Tc^{(0)}$.

As being connected to the communication line 3a, the ECU 1 and the relay apparatus 2a can send and receive data on the basis of the CAN protocol. In the case that the ECU 1 succeeds to start sending the generated data when the local time of the ECU 1 comes to the $Ts^{(0)}$, the relay apparatus 2a simultaneously starts receiving the sent data when the local time of the relay apparatus 2a comes to $Tm^{(1)}$. As referring the time lag $Td^{(0)}$ indicated by the time lag information that is added on the data sent by the ECU 1 (i.e., the received data by the control unit 20), the control unit 20 of the relay apparatus 2a can determine that the time of the generating time point according to the received data is $Tc^{(1)}=Tm^{(1)}-Td^{(0)}$ in the local time of the relay apparatus 2a.

The relay apparatus 2a receives the generated data from the ECU 1, and then transfers the received data to the ECUs 1, 1, . . . and the relay apparatus 2b connected to the communication line 3b. At that time, the control unit 20 of the relay apparatus 2a obtains the $Ts^{(1)}$ of the transferring start time point at which the communication unit 23 has succeeded to start transferring the received data, as shown by the flowchart of FIG. 4 described above. Further, the control unit 20 calculates the time lag between the $Ts^{(1)}$ of the transferring start time point and the $Tc^{(1)}$ of the generating time point, i.e., the time lag $Td^{(1)}$ that is a difference between the $Tm^{(1)}$ of the receiving time point according to the relay apparatus 2a and the $Ts^{(1)}$ of the transferring time point plus the time lag $Td^{(0)}$ indicated by the time lag information received together with the sent data. Further, the control unit 20 adds information of the calculated time lag $Td^{(1)}$ onto the data to be transferred, and sends the information of the calculated time lag $Td^{(1)}$, too.

When having received data transferred by the relay apparatus 2a, the ECUs 1, 1, . . . connected to the communication line 3b can determine $Tc^{(2)}$ of the generating time point based on the own local time, in accordance with the time lag $Td^{(1)}$ indicated by the time lag information that is added on the received data (i.e., the transferred data by the repay apparatus 2a) and with the $Tm^{(2)}$ of the own receiving start time point.

When having received data that are relayed (transferred) "k" times, the ECU 1 can similarly determine the time $Tc^{(k)}$ of the generating time point according to the received data (i.e., the relayed/transferred data) based on own local time, in accordance with the time lag $Td^{(k-1)}$ indicated by the time lag information that is added on the received data (i.e., relayed/transferred data) and with the time $Tm^{(k)}$ of the receiving start time point of the relayed/transferred data in this ECU 1. The time lag information added on the received data indicates the time lag between the time of the generating time point and the time of the sending (receiving) start time point clocked with a predetermined frequency, even in the case that the received data has been relayed many times. Therefore, the time of the generating time point according to the received data is $Tc^{(k)}$ is earlier the time lag $Td^{(k-1)}$ than the time $Tm^{(k)}$ of the receiving start time point, even in the case that the received data has been relayed many times.

As described above, the ECUs 1, 1, . . . and the relay apparatuses 2a, 2b, . . . can determine the time of the generating time point based on own local time, even in the case that the time of the clock unit 12 and clock unit 22 are not synchronized with each other on the basis of a predetermined absolute time. Thus, the generating time points of the $Tc^{(0)}$, the $Tc^{(1)}$ and the $Tc^{(k)}$ are identical to each other as shown in FIG. 5, although the $Tc^{(0)}$, the $Tc^{(1)}$ and the $Tc^{(k)}$ are represented with different superscript numbers as shown in FIG. 5.

(Embodiment 2)

In the embodiment 1, each control unit 10 of the ECUs 1, 1, . . . and each control unit 20 of the relay apparatuses 2a, 2b, . . . are configured to obtain the time information of the transmitting (i.e., sending, and transferring) start time point in response to succeeding to start sending data, and configured to add the obtained time information onto the data during the transmitting process. On the other hand, an embodiment 2 is configured to set the transmitting (i.e., sending, and transferring) start time point in advance, and try to transmit data after obtaining the time lag information to be added onto the data to be transmitted.

A communication system in the embodiment 2 has configurations similar to those of the communication system in the embodiment 1, except for detailed processes performed by each control unit 10 of the ECUs 1, 1, . . . and detailed processes performed by each control unit 20 of the relay apparatuses 2a, 2b, . . . . In the following descriptions, the same numerals are applied to the configurations common in the embodiments 1 and 2, and those common configurations are not described in detail, but different configurations in the embodiments 1 and 2 are described in detail, i.e., about the processes performed by each control unit 10 of the ECUs 1, 1, . . . and the processes performed by each control unit 20 of the relay apparatuses 2a, 2b, . . . , in reference to the flowcharts.

Figure 6:
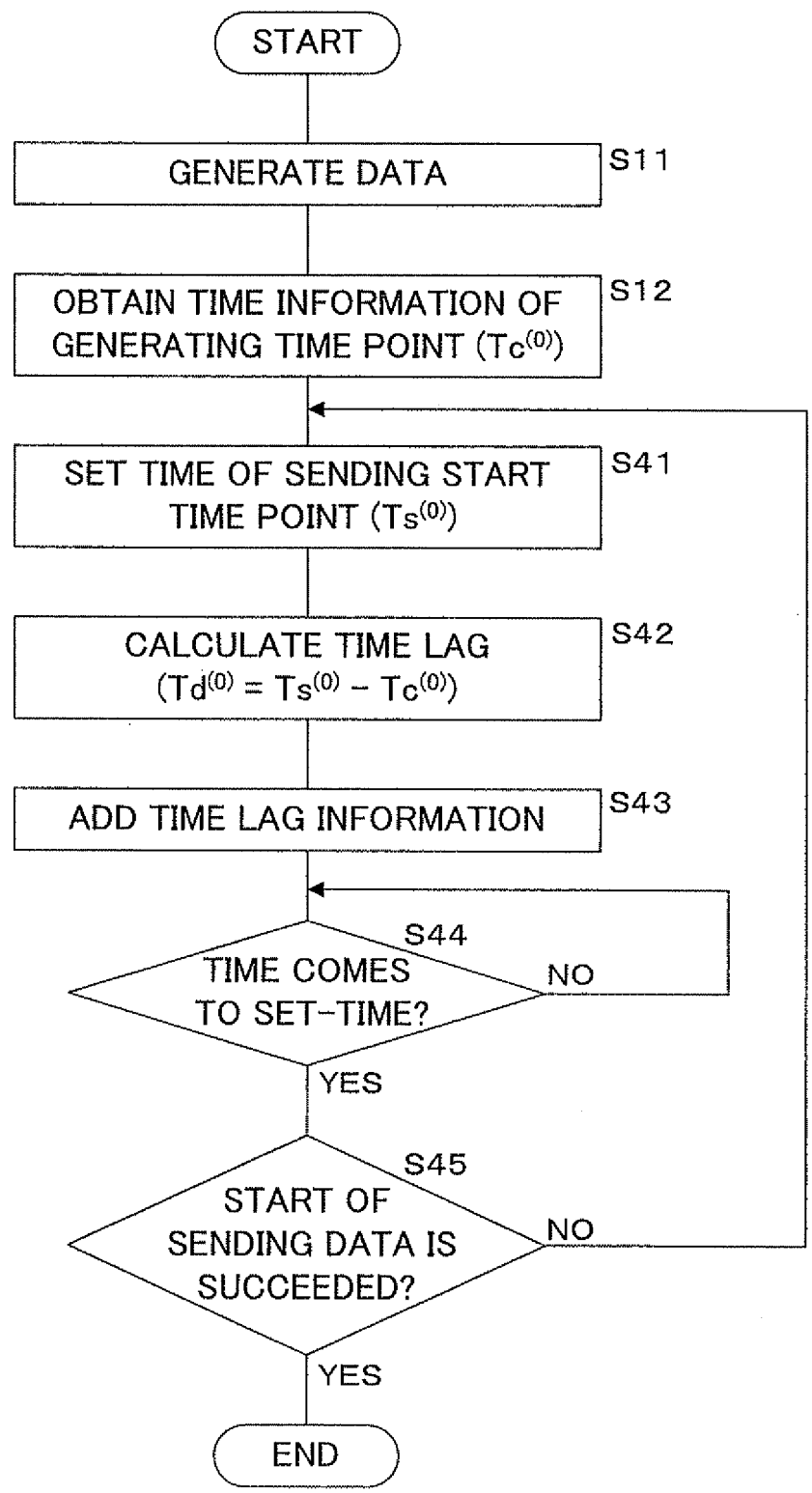
FIG. 6 is a flowchart showing an example of communication procedure that a control unit of an ECU generates data and sends the data together with time lag information in an embodiment 2.

FIG. 6 is a flowchart showing an example of communication procedure that each control unit 10 of the ECUs 1, 1, . . . generates data and sends the data together with the time lag information in the embodiment 2. The following flowchart represents processes performed by the control unit 10 of an ECU 1 connected to the communication line 3a. Each control unit 10 of another ECUs 1, 1, . . . also performs similar processes. In the flowchart described below, the same step numbers are applied to the processes common with those in the flowchart of FIG. 2, and the common processes are not described in detail.

After obtaining information of the time $Tc^{(O)}$ of the generating time point clocked by the clock unit 12 (S12), the control unit 10 sets estimated time for starting to send the generated data, i.e., the time $Ts^{(O)}$ of the sending start time point (step S41). Then, the control unit 10 calculates a time lag $(Td^{(O)}=Ts^{(O)}-Tc^{(O)})$ that is a difference between the time $Ts^{(O)}$ of the sending start time point and the time $Tc^{(O)}$ of the generating time point (step S42).

The control unit 10 adds the time lag information indicating the calculated time lag $(Td^{(O)})$ onto the generated data (i.e., the data to be sent) (step S43), and decides whether the time clocked by the clock unit 12 comes to the set time $(Ts^{(O)})$ of the sending start time point or not (step S44). When having decided that the time does not come to the set time $(Ts^{(O)})$ of the sending start time point (S44: NO), the control unit 10 returns the procedure to the step S44.

When having decided that the time comes to the set time $(Ts^{(O)})$ of the sending start time point (S44: YES), the control unit 10 allows the communication control unit 13 to try sending the data generated at the step S11 and decides whether the communication control unit succeeds or fails to start sending the generated data (step S45). When having determined that the communication control unit fails to start sending the generated data because another of the ECUs 1, 1, . . . or the relay apparatus 2a connected to the communication line 3a is in communication or the control unit 10 is not selected by the arbitration (S45: NO), the control unit 10 returns the procedure to the step S41 and sets new time $Ts^{(O)}$ of the sending start time point for trying to send the generated data again.

When having decided that the communication control unit succeeds to start sending the generated data because the ECUs 1, 1, . . . and the relay apparatus 2a connected to the communication line 3a are not in communication or the control unit 10 is selected by the arbitration (545: YES), the control unit 10 continues the sending process of the data, and terminates the procedure after completing the sending process.

Although information of the previously-set time is added on the generated data (i.e., the data to be sent) as information of the time of the sending start time point, the previously-set time becomes just the time that the sending process of the generated data has been actually started, in the case that the communication control unit has succeeded to start sending the generated data. The embodiment 2 also utilizes the procedure shown by the flowchart in FIG. 3 of the embodiment 1, for making each control unit 10 of the ECUs 1, 1, . . . having received the generated data (i.e., the sent data by the ECU 1) or each control unit 20 of the relay apparatuses 2a, 2b, . . . having received the generated data (i.e., the sent data by the ECU 1) determine the time of the generating time point. Thus, it is possible to correctly determine the time of the generating time point, even on the basis of the time lag information that indicates the time lag $(Td^{(O)})$ and is obtained through the procedure shown by the flowchart of FIG. 6.

Figure 7:
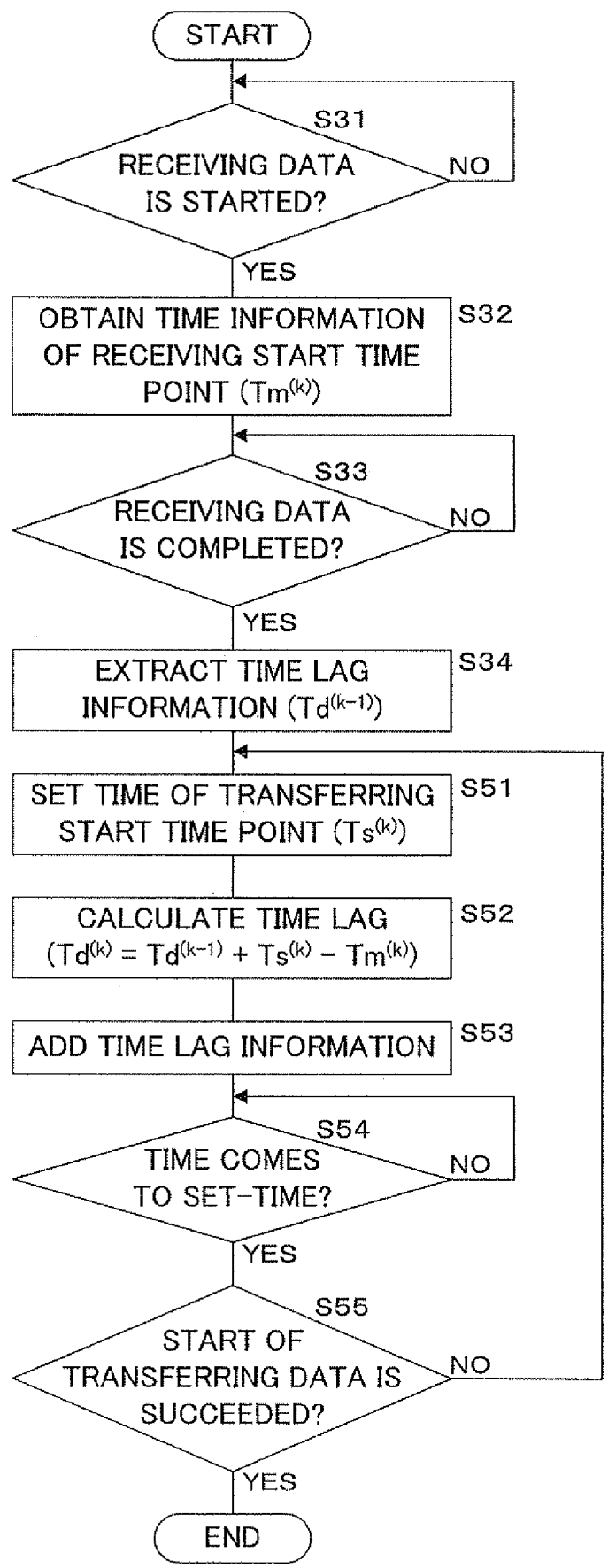
FIG. 7 is a flowchart showing an example of communication procedure that a control unit of a relay apparatus transfers data in the embodiment 2.

FIG. 7 is a flowchart showing an example of communication procedure that each control unit 20 of the relay apparatuses 2a, 2b, . . . transfers data in the embodiment 2. The following flowchart represents processes that the control unit 20 of the relay apparatus 2a connected to the communication lines 3a, 3b receives data from an ECU 1 connected to the communication line 3a and transfers the received data to apparatuses connected to the communication line 3b. The control unit 20 of the relay apparatus 2a performs similar processes for receiving data from an apparatus connected to the communication line 3b and transferring the received data to the ECUs 1, 1, . . . connected to the communication line 3a, too. Furthermore, each control unit 20 of another relay apparatuses 2b, 2c, . . . also performs similar processes.

In the flowchart described below, the same step numbers are applied to the processes common with those shown by the flowchart of FIG. 4 in the embodiment 1, and the common processes are not described in detail.

The control unit 20 extracts the time lag information indicating the time lag $(Td^{(k-1)})$ from the received data (S34). In the case that the received data should be transferred to the ECUs 1, 1, . . . and the replay apparatus 3b connected to a port different from the port through which the data is received, the control unit 20 performs the following processes after extracting the time lag information.

The control unit 20 sets the estimated time for starting to send (i.e., transfer) the data, i.e., the time $(Ts^{(k)})$ of the sending start time point (step S51). Then, the control unit 20 calculates the time lag $(Td^{(k)}=Td^{(k-1)}+(Ts^{(k)}-Tm^{(k)}))$ that is the difference between the set estimated time $(Ts^{(k)})$ of the sending start time point and the time $(Tm^{(k)})$ of the receiving start time point plus the time lag $(Td^{(k-1)})$ indicated by the received (i.e., extracted) time lag information (step S52).

The control unit 20 adds the time lag information indicating the calculated time lag $(Td^{(k)})$ onto the generated data (step S53), and decides whether the time clocked by the clock unit 22 comes to the estimated time $(Ts^{(k)})$ of the sending start time point having been set at the step S51 or not (step S54). When having decided that the time does not come to the set estimated time $(Ts^{(k)})$ of the sending start time point (S54: NO), the control unit 20 returns the procedure to the step S54.

When having decided that the time comes to the set estimated time $(Ts^{(k)})$ of the sending start time point (554: YES), the control unit 20 allows the communication unit 23 to try transferring (i.e., sending) the data and decides whether the communication unit succeeds or fails to start transferring the data (step S55). When having determined that the communication unit fails to start transferring the data because another of the ECUs 1, 1, . . . or the relay apparatus 2b connected to the communication line 3b is in communication or the control unit 20 is not selected by the arbitration (S 55: NO), the control unit 20 returns the procedure to the step S51 and sets new estimated time $Ts^{(k)}$ of the transferring start time point for trying to transfer the received data again.

When having decided that the communication unit succeeds to start transferring the received data because the ECUs 1, 1, . . . , and the relay apparatus 2b connected to the communication line 3b are not in communication or the control unit 20 is selected by the arbitration (S55: YES), the control unit 20 continues the transferring process of the received data, and terminates the procedure after completing the transferring process.

Although the set estimated time is added on the data as the time of the transferring start time point, the set estimated time becomes just the time that the transferring process of the received data has been actually started, in the case that the communication unit has succeeded to start transferring (i.e., sending) the data. Therefore, it is possible to correctly determine the time of the generating time point of the received data, even on the basis of the time lag information indicating the time lag ($Td^{(k)}$) that is calculated through the procedure shown by the flowchart of FIG. 7.

The embodiment 2 is configured to try sending and transferring data after obtaining information including the time lag information. Therefore, the communication control unit 13 and the communication unit 23 do not require performing the re-writing process of the field indicating time lag information within the data that is in the sending process or the transferring process.

The embodiments 1 and 2 are illustrated to transmit the time lag information indicating the time lag that is calculated on the basis of the time information clocked by each clock unit 12 of the ECUs 1, 1, . . . and each clock unit 22 of the relay apparatuses 2a, 2b, . . . and the time lag information is illustrated to be transmitted together with the transmitted data. However, such the time lag information may be configured to indicate a time lag expressed, for example, in nanoseconds. In that configuration, each clock unit 12 of the ECUs 1, 1, . . . may clock with a predetermined frequency different from the frequency with which each clock unit 22 of the relay apparatuses 2a, 2b, clocks. Thus, even in the case that the clock unit 12 of the ECU 1 connected to the communication line 3a is configured to clock with 600 MHz and the clock unit 22 of the relay apparatus 2a is configured to clock with 3 GHz, the time lag information can be transmitted after the expression of the transmitted time lag information is modified with nanoseconds, and the control unit 10 and the control unit 20 can respectively match the unit of the transmitted time lag information with the unit of the time information obtained by the clocking of the clock unit 12 and the clock unit 22.

The embodiments 1 and 2 are illustrated that the communication lines 3a, 3b are based on the CAN protocol. However, the present invention is not limited to utilize such the data communication based on the CAN protocol through the communication lines 3a, 3b. It is possible to utilize the data communication based on another protocol, such as the Local Interconnect Network (LIN), and the Flex Ray (registered trade mark), for example, with applying such the protocol to the communication apparatus included in the communication system mounted on a motor vehicle.

The embodiments 1 and 2 are illustrated that the ECUs 1, 1, . . . and the relay apparatuses 2a, 2b, . . . are respectively connected to the communication lines 3a, 3b, . . . with a bus topology. Thus, it is possible to abandon sending data from a plurality of apparatuses simultaneously, to make another apparatuses simultaneously receive the data sent by one apparatus through monitoring the communication lines 3a, 3b, . . . , and to neglect a time lag between the time of the sending start time point and the time of the receiving start time point, in the data communication through the communication lines 3a, 3b, . . . . However, the present invention is not limited to this illustration. The ECUs 1, 1, . . . and the relay apparatuses 2a, 2b, . . . may be connected with another connection topology that causes no-zero time lag between the time of the sending start time point and the time of the receiving start time point. Although the caused no-zero time lag may have an effect on determining the time of the generating time point, such topology does not cause a problem in the case that the caused no-zero time lag have little effect on the accuracy required for the time of the generating time point to be determined.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A communication apparatus having a clock unit, and a communication unit for sending and receiving data, comprising:
   a data generating unit that generates a first data;
   a generation obtaining unit that obtains a generating time point based on the clock unit and corresponding to the time that the first data is generated;
   a sending obtaining unit that obtains a sending start time point based on the clock unit and corresponding to the time that the communication unit starts to externally send the first data;
   a calculation unit that calculates a time lag between the generating time point and the sending start time point;
   an addition unit that adds time lag information onto the first data, the time lag information indicating the time lag calculated by the calculation unit;
   a reception determination unit that determines a receiving start time point based on the clock unit and corresponding to the time that the communication unit externally receives a second data;
   an extraction unit that extracts added time lag information from the second data; and
   a generation determination unit that determines a data generating time point of the second data based on the added time lag information and the receiving start time point, wherein
   the communication unit externally sends the first data onto which the time lag information has been added by the addition unit.

2. The communication apparatus according to claim 1, further comprising:
   a send time determination unit that determines, based on the clock unit, whether the sending start time point has elapsed, wherein
   when the send time determination unit determines that the sending start time point has elapsed,
   the sending obtaining unit obtains a new sending start time point,
   the calculation unit recalculates the time lag,
   the addition unit updates the time lag information added onto the first data, and
   the communication unit resends the first data onto which the time lag information has been added by the addition unit.

3. The communication apparatus according to claim 2, further comprising:
   a transfer obtaining unit that obtains a transferring start time point based on the clock unit and corresponding to the time that the communication unit starts to externally send the second data; and
   a second calculation unit calculates a second time lag between the generating time point of the second data and the transferring start time point, wherein
   the addition unit adds second time lag information onto to the second data, the second time lag information indicating the second time lag calculated by the second calculation unit, and
   the communication unit sends the second data onto which the second time lag information has been added by the addition unit to another communication apparatus.

4. The communication apparatus according to claim 1, further comprising:

a transfer obtaining unit that obtains a transferring start time point based on the clock unit and corresponding to the time that the communication unit starts to externally send the second data; and a second calculation unit calculates a second time lag between the generating time point of the second data and the transferring start time point, wherein the addition unit adds second time lag information onto to the second data, the second time lag information indicating the second time lag calculated by the second calculation unit, and the communication unit sends the second data onto which the second time lag information has been added by the addition unit to another communication apparatus.

5. A communication system comprising a plurality of communication apparatuses, each communication apparatus having a clock unit, and a communication unit for sending and receiving data, wherein each communication apparatus comprises:

a data generating unit that generates a first data;

a generation obtaining unit that obtains a generating time point based on the clock unit and corresponding to the time that the first data is generated;

a sending obtaining unit that obtains a sending start time point based on the clock unit and corresponding to the time that the communication unit starts to externally send data;

a calculation unit that calculates a time lag between the generating time point and the sending start time point;

an addition unit that adds time lag information onto the first data, the time lag information indicating the time lag calculated by the calculation unit;

a reception determination unit that determines a receiving start time point based on the clock unit and corresponding to the time that the communication unit externally receives a second data;

an extraction unit that extracts added time lag information from the second data; and a generation determination unit that determines a data generating time point of the second data based on the added time lag information and the receiving start time point, wherein the communication unit externally sends the first data onto which the time lag information has been added by the addition unit.

6. A method performed by a communication apparatus having a clock unit, and a communication unit for sending and receiving data, the method comprising:

generating a first data;

obtaining a generating time point based on the clock unit and corresponding to the time that the first data is generated;

obtaining a sending start time point based on the clock unit and corresponding to the time that data is sent;

calculating a time lag between the generating time point and the sending start time point;

adding time lag information onto the first data, the time lag information indicting the time lag;

determining a receiving start time point based on the clock unit and corresponding to the time that a second data is received;

extracting added time lag information from the second data;

determining a data generating time point of the second data based on the added time lag information and the receiving start time point; and sending the first data onto which the time lag information has been added.

7. A method performed by a communication apparatus having a clock unit, and a communication unit for sending and receiving data, the method comprising:

determining a sending start time point to send a data;

calculating a time lag between time of the sending start time point and a generating time point at which the data is generated;

adding time lag information onto the data, the time lag information indicating the time lag;

deciding whether the sending start time point has elapsed;

sending the data onto which the time lag information has been added when it is decided that the sending start time point has elapsed; and when it determined that the sending start time point has elapsed:

obtaining a new sending start time point;

recalculating the time lag based on the new sending start time point and the generating time point at which the data is generated;

updating the time lag information added onto the data, and resending the data onto which the time lag information has been added.

* * * * *